Patented May 27, 1930

1,760,129

UNITED STATES PATENT OFFICE

HERBERT G. M. FISCHER, OF WESTFIELD, NEW JERSEY, ASSIGNOR TO STANDARD OIL DEVELOPMENT COMPANY, A CORPORATION OF DELAWARE

PROCESS OF REMOVING ASH-FORMING CONSTITUENTS FROM OIL

No Drawing. Application filed April 8, 1926. Serial No. 100,718.

This invention relates to improvements in the removal of ash-forming constituents from hydrocarbon oils. The invention is particularly applicable to oils containing alkali compounds formed in the neutralization of the oil following its treatment with sulfuric acid. In accordance with the present process, such alkali compounds are hydrated and caused to separate from the oil.

The invention will be fully understood from the following description, in which the treatment of Ranger crude for the production of cylinder stocks is given by way of illustration. It is to be understood that the invention is not limited to this particular use.

In preparing cylinder stocks from Ranger crude, and other crudes which, though composed predominantly of paraffin hydrocarbons yet contain substantial amounts of asphaltic constituents, the asphaltic constituents may be removed by means of sulfuric acid. The acid treatment forms oil-soluble organic acids of various types. These acids must be neutralized, which is generally accomplished by addition of caustic soda to the oil.

The sodium soaps resulting from the neutralization are for the most part oil-soluble and form the ash-producing constituents. They are highly objectionable in oils which are to be run for cylinder stocks. When the crude has a high ash content, it is impractical to meet the ash specification on unfiltered cylinder oils. Filtration is expensive and relatively ineffective.

The acid treated and neutralized crude oil is topped, the heat applied being sufficient to cause the decomposition of the soaps, producing sodium sulfate in very finely divided, amorphous, substantially anhydrous condition, suspended in the cylinder stock remaining in the still. It is impractical to give precise directions for the time and temperature of heating, since these will vary with the particular stock, the condition of the soaps, and other factors. Temperatures of 400° to 500° F., maintained during the distillation period, may be mentioned as generally suitable.

When relatively dilute sulfuric acid, such as 66° acid, is used in the acid treating referred to, the crude may be distilled either in neutral or slightly acid condition. When neutral, somewhat higher still temperatures are necessary to bring about the complete decomposition of the soaps than when the oil is acid. With 98% acid the oil must generally be left in a slightly acid condition. Complete neutralization will so stabilize the soaps (alkali metal sulfonates) as to prevent their decomposition under normal conditions. In all cases an excess of alkali is to be avoided, as it would increase the amount of ash.

The amorphous sodium sulfate suspended in the oil is hydrated by the addition of water, which in general must be associated with a substance facilitating access of the water to the particles of sodium sulfate or having an equivalent effect. An alcohol (especially ethyl or isopropyl alcohol) is preferred as the agent for facilitating hydration. However, I may use also other organic compounds, such as the ethers (e. g. sulfuric ether), aldehydes (e. g. formaldehyde), ketones (e. g. methyl ethyl ketone), acetic acid, phenol, or various mixtures of such compounds. A general characteristic of suitable treating agents is miscibility with the oil. If the oil itself contains a hydration-facilitating reagent, this may take the place of all or some of the reagent normally to be added. The hydration-facilitating reagent is preferably soluble in water and in all cases the oil, water, and reagent are intimately mixed. I shall refer to the reagent added to the water as adapted to facilitate hydration, but this does not imply that the reagent has no other effect.

The following example is illustrative: 1000 barrels (50 gal.) of topped oil containing 0.2% by weight of ash in the form of combined alkali expressed as sodium sulphate, is treated with about 100 gallons of water containing 1% by volume of isopropyl alcohol of 85–90% strength. The alcohol solution is best added to the oil at a temperature between 150° and 200° F., and it is desirable to agitate the mixture thoroughly, as by passing it through several sections of a treating column. The oil is then allowed to stand, and the hydrated sodium sulfate ($Na_2SO_4.10 H_2O$) will speedily settle out. The amount of water in this case is calculated to produce the decahydrate without any substantial excess of water.

It will generally be found, however, that it is better to use more water than that specified in the above example, say twice as much water, for the following reason: The sodium sulfate will in this way first be hydrated and then dissolved, forming a concentrated solution which will separate from the oil and may be drawn off. However, care must generally be taken not to add more water than that which corresponds approximately to three times the quantity necessary to form the decahydrate. This is the upper limit with some crudes, beyond which there is danger that emulsification will take place and the settling of the ash-forming constituents be delayed or prevented.

In running Ranger crude, an ash content of 0.20 to 0.22% is usually found in the oil as it leaves the topping still. After treating this oil as described above, it shows a substantially zero ash content.

Various uses of the process other than those described above may be made and it may be said in general that it is applicable to all oils containing suspended salts which can be hydrated. Various changes in the procedure and proportions specified may be made within the scope of the appended claims, in which it is my intention to claim all novelty inherent in the invention as broadly as the prior art permits.

I claim:

1. Process of removing sodium sulfate from hydrocarbon oils, comprising adding water to the oil in amount at least sufficient to form a hydrated sodium sulfate but not much in excess thereof, adding also an organic hydration-facilitating agent, intimately mixing the oil, water and hydration-facilitating agent, and separating the hydrated sodium sulfate from the oil.

2. Process for removing ash-forming hydratable constituents existing in relatively anhydrous form in an oil, comprising adding water to the oil, the quantity being at least sufficient to form a hydrate but not in excess of three times that amount, bringing oil and water into intimate contact, and removing the constituents in hydrated form.

3. Process of removing sodium sulfate from hydrocarbon oils, comprising adding water to the oil in amount sufficient to form the decahydrate of sodium sulfate, but not in excess of three times said amount, utilizing in conjunction with the water an organic hydration-facilitating agent, intimately mixing the oil, water and hydration-facilitating agent, and separating the hydrated sodium sulfate.

4. Process of removing ash-forming constituents from petroleum oils of the type adapted for the production of cylinder stocks, comprising decomposing by regulated heating the alkali soaps formed in the usual neutralization of the oil, thereby converting said soaps into sodium sulfate in substantially anhydrous and colloidal condition, hydrating said sodium sulfate by bringing it into contact in the oil with water, and separating the hydrated sodium sulfate.

5. Process according to claim 4, in which about 1% by volume of isopropyl alcohol is dissolved in the water.

6. Process according to claim 4, in which the hydration is effected at a temperature between about 150° to 200° F.

7. Process according to claim 4, in which water contains a hydration facilitating agent.

8. Process for removing ash-forming hydratable constituents existing in an amorphous form in an oil, comprising adding water containing an organic hydration facilitating agent to the oil in an amount at least sufficient to form a hydrate with said constituents, bringing oil and water into intimate contact and separating said constituents in a hydrated form.

9. Process according to claim 8, in which the water contains a small percentage of an alcohol.

HERBERT G. M. FISCHER.